US010213025B1

(12) United States Patent
Al-Bannai

(10) Patent No.: US 10,213,025 B1
(45) Date of Patent: Feb. 26, 2019

(54) COLLAPSIBLE LOVEMAKING APPARATUS

(71) Applicant: Abdulrahman M. A. Al-Bannai, Salmiya (KW)

(72) Inventor: Abdulrahman M. A. Al-Bannai, Salmiya (KW)

( * ) Notice: Subject to any disclaimer, the term of this patent is extended or adjusted under 35 U.S.C. 154(b) by 0 days.

(21) Appl. No.: 15/867,264

(22) Filed: Jan. 10, 2018

(51) Int. Cl.

| | |
|---|---|
| ***A61C 15/00*** | (2006.01) |
| ***A47C 15/00*** | (2006.01) |
| ***A47C 4/52*** | (2006.01) |
| ***A47C 7/54*** | (2006.01) |
| ***A47C 3/40*** | (2006.01) |
| ***A47C 1/025*** | (2006.01) |
| ***A47C 3/18*** | (2006.01) |
| ***A61G 5/10*** | (2006.01) |
| ***A61G 5/08*** | (2006.01) |

(52) U.S. Cl.
CPC ............ *A47C 15/008* (2013.01); *A47C 1/025* (2013.01); *A47C 3/18* (2013.01); *A47C 3/40* (2013.01); *A47C 4/52* (2013.01); *A47C 7/543* (2013.01); *A61G 5/0866* (2016.11); *A61G 5/107* (2013.01); *A61G 5/1059* (2013.01); *A61G 5/1072* (2013.01); *A61G 5/1086* (2016.11); *A61G 2200/16* (2013.01); *A61G 2203/80* (2013.01)

(58) Field of Classification Search
CPC ................ A61G 13/00; A61G 13/0009; A61G 13/0018; A61G 13/0081; A61G 13/009; A61G 13/02; A61G 13/04; A61G 15/00; A61G 15/002; A61G 15/02; A61G 15/08; A61G 2200/16; A61G 2203/80; A61G 5/1059; A61G 5/1072; A61G 5/1086; A61G 5/107; A61G 5/0866; A47C 4/04; A47C 4/52; A47C 7/543; A47C 15/008; A47C 3/40; A47C 3/18; A47C 1/025
USPC .......................................................... 128/845
See application file for complete search history.

(56) References Cited

U.S. PATENT DOCUMENTS 187,429 A * 2/1877 Sykes .................. A47B 83/045 297/143
2,578,879 A * 12/1951 De Young .............. A47C 1/027 297/373
2,844,193 A * 7/1958 Lauterbach .............. A47C 1/03 297/116

(Continued)

FOREIGN PATENT DOCUMENTS

| | | |
|---|---|---|
| JP | 2005305084 | 11/2005 |
| WO | 2014/15526 A1 | 10/2014 |

*Primary Examiner* — Keri J Nelson
*Assistant Examiner* — Adam Baker
(74) *Attorney, Agent, or Firm* — Richard C. Litman

(57) ABSTRACT

The collapsible lovemaking apparatus has an elongated housing having opposing ends. A floor, a top platform, opposing sidewalls, and a rigidly fixed end wall having a handle form the housing and define a hollow interior. A chair platform is slidably mounted on telescoping tubes attached to the floor, the platform being slidable out of the open housing end and supported at one end by wheels. An adjustable height pedestal chair is mounted on the platform, the chair back being rotatable 180° to define an end wall closing the open end of the housing. A second chair seat having a reclining chair back is mounted on a trolley on the top platform facing the adjustable height chair, the reclining back being collapsible to a flat position. The pedestal chair and the trolley-mounted chair seat may roll towards and away from each other to facilitate love making.

6 Claims, 8 Drawing Sheets

(56) References Cited

U.S. PATENT DOCUMENTS

| | | | | | |
|---|---|---|---|---|---|
| 4,699,423 | A * | 10/1987 | Fitzig | A47C 9/02 297/215.14 |
| 4,736,998 | A * | 4/1988 | Wilson | A47B 83/02 297/140 |
| 5,453,080 | A | 9/1995 | Mitchum, Jr. | |
| 5,620,230 | A * | 4/1997 | Wu | A47C 1/06 248/405 |
| 5,875,779 | A | 3/1999 | Fuhrman | |
| 6,286,164 | B1 * | 9/2001 | Lamb | A61G 13/0036 128/845 |
| 6,550,084 | B2 * | 4/2003 | Siepmann | A47C 16/02 5/507.1 |
| 6,698,431 | B1 | 3/2004 | Harris | |
| 7,386,899 | B2 * | 6/2008 | Smith | A61G 13/0018 5/507.1 |
| 7,431,036 | B2 | 10/2008 | Al-Bannai | |
| 7,694,684 | B2 * | 4/2010 | Bochner | A61G 13/0018 128/845 |
| 2002/0092096 | A1 * | 7/2002 | Heimbrock | A61G 7/0507 5/618 |
| 2003/0126686 | A1 | 7/2003 | Nash | |
| 2015/0123447 | A1 * | 5/2015 | Warren, Jr. | A47C 7/543 297/411.32 |

* cited by examiner

COLLAPSIBLE LOVEMAKING APPARATUS

BACKGROUND

1. Field

The disclosure of the present patent application relates to furnishings for the disabled, and particularly to a collapsible lovemaking apparatus that has features for assisting a disabled person to have marital relations with a consenting adult.

2. Description of the Related Art

Sexual intimacy and performance of the marital act are an integral part of the marital relationship, helping husband and wife to preserve closeness in their dealings with each other. However, sometimes disease or injury makes it difficult or painful for a disabled person to assume or maintain the positions or movements required to engage in sexual intercourse on a conventional bed. Men with back and spinal problems, infirm persons, obese persons, and other disabled persons may need an apparatus for facilitating sexual relations.

The Love Making Apparatus for the Disabled described in my prior patent, U.S. Pat. No. 7,431,036, issued Oct. 7, 2008, by providing a horizontal support with two co-planar platforms mounted thereon, one platform being stationary and having an adjustable backrest, the other platform being reciprocally translatable towards and away from the stationary platform and having a pair of handgrips on the end closest to the stationary platform. While the apparatus described in the '036 patent represented an advance in the state of the art, nevertheless, the device shown in the patent is an open frame, stationary device that may occupy significant space and may be difficult to store when not in use.

Thus, a collapsible lovemaking apparatus solving the aforementioned problems is desired.

SUMMARY

The collapsible lovemaking apparatus has an elongated housing having opposing ends. A floor, a top platform, opposing sidewalls, and a rigidly fixed end wall having a handle form the housing and define a hollow interior. A chair platform is slidably mounted on telescoping tubes attached to the floor, the platform being slidable out of the open housing end and supported at one end by wheels. An adjustable height pedestal chair is mounted on the platform, the chair back being rotatable 180° to define an end wall closing the open end of the housing. A second chair seat having a reclining chair back is mounted on a trolley on the top platform facing the adjustable height chair, the reclining back being collapsible to a flat position. The pedestal chair and the trolley-mounted chair seat may roll towards and away from each other to facilitate love making.

Opposing transport wheels are mounted beneath the floor at the open end of the housing so that the handle on the rigid end wall can be grasped and lifted to tilt the apparatus onto the transport wheels to move the apparatus in a manner similar to a wheeled suitcase. High-friction bumpers may be mounted beneath the floor below the rigid end wall and the sidewalls so that the base of the apparatus doesn't move during love making. The reclining chair back has a pair of collapsible arm rests and the pedestal chair has at least one collapsible arm rest for the comfort of the users. The trolley-mounted chair seat and reclining chair back, as well as the seat and back of the pedestal chair, may be upholstered or provided with other chair coverings for comfort and appearance, if desired.

These and other features of the present disclosure will become readily apparent upon further review of the following specification and drawings.

DETAILED DESCRIPTION OF THE PREFERRED EMBODIMENTS

Figure 1:
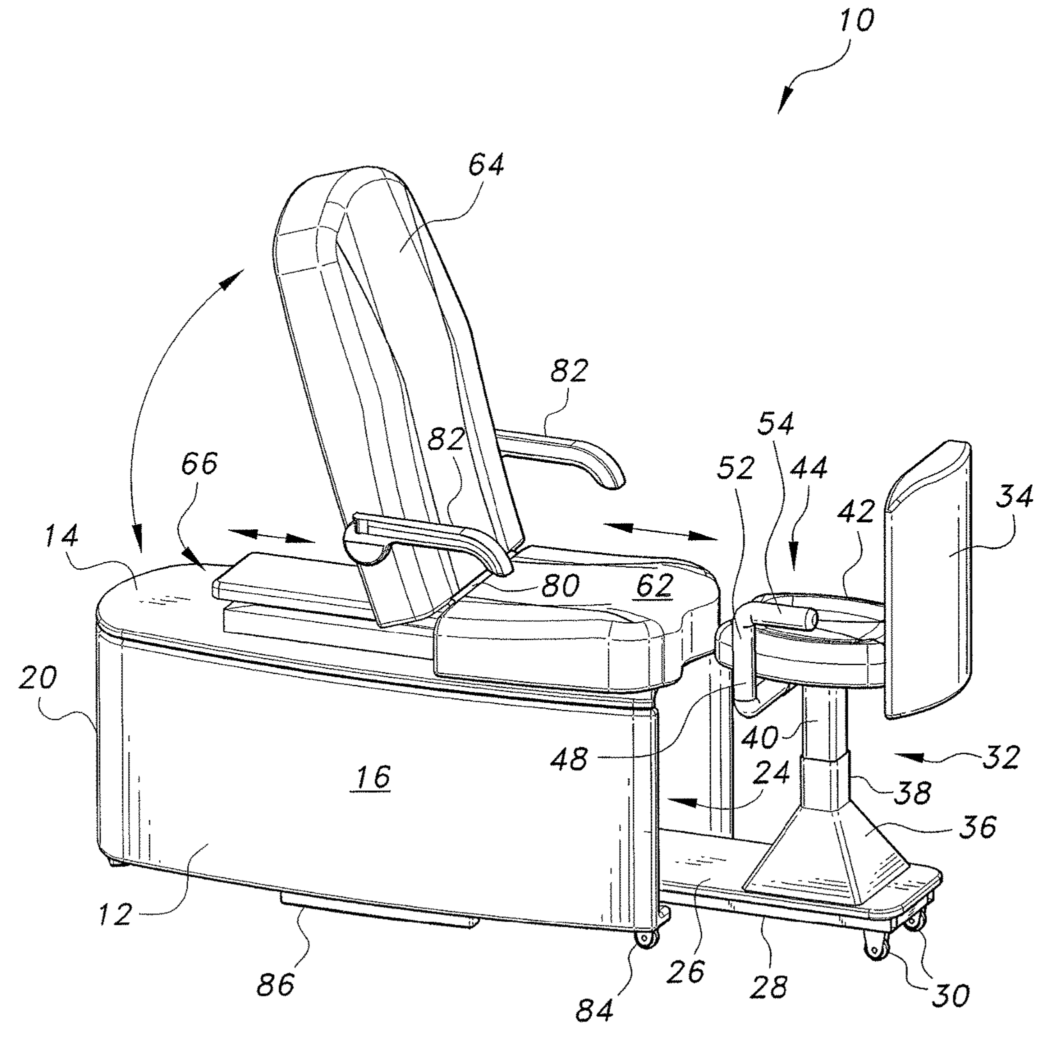
FIG. 1 is a perspective view of a collapsible lovemaking apparatus, shown deployed for use.
Figure 2:
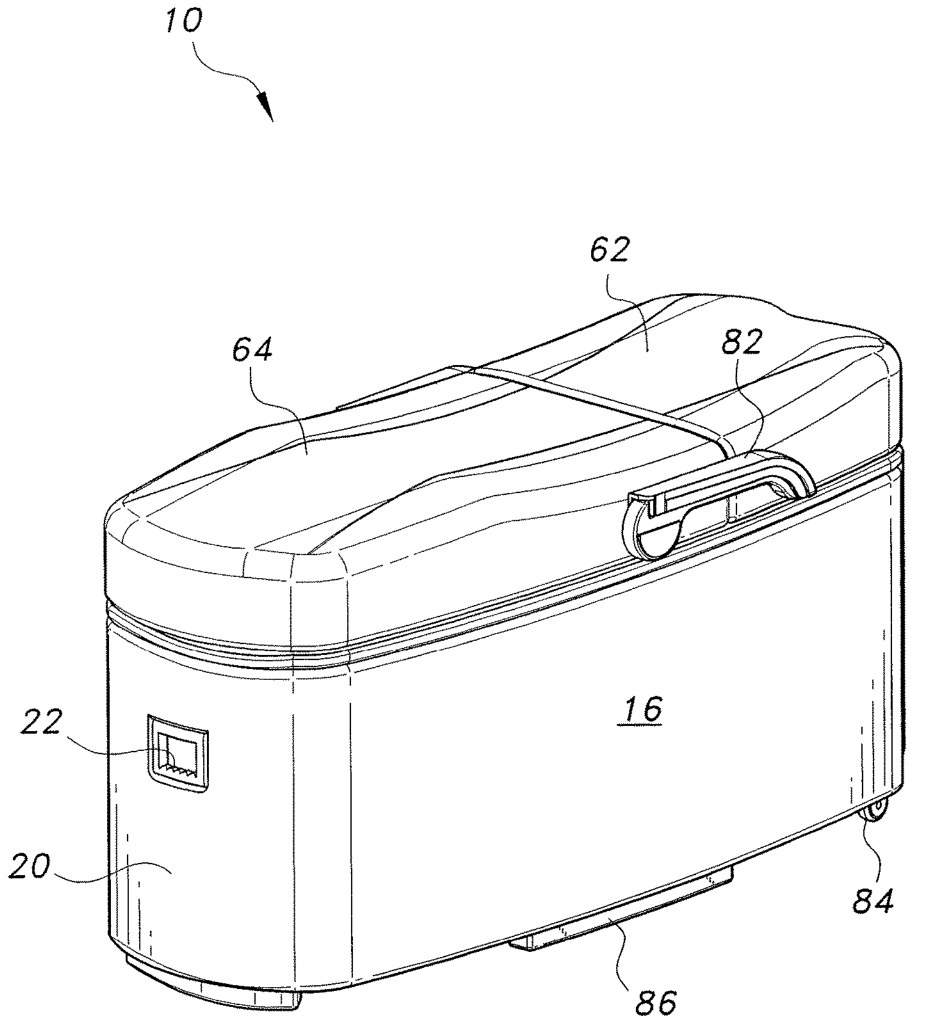
FIG. 2 is a perspective view of the collapsible lovemaking apparatus of FIG. 1, shown collapsed for transport or storage.
Figure 3:
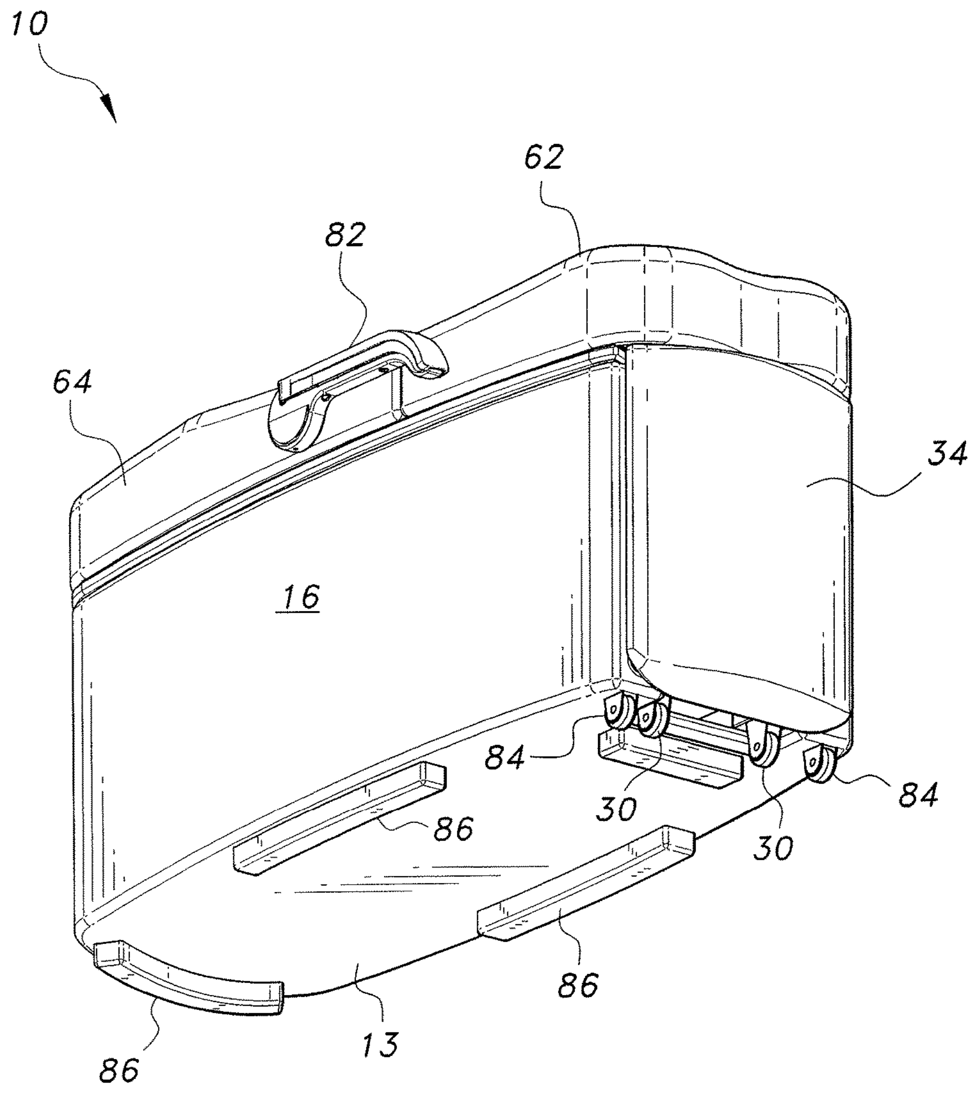
FIG. 3 is a perspective view of the collapsible lovemaking apparatus of FIG. 1, shown collapsed and as seen from below.
Figure 4:
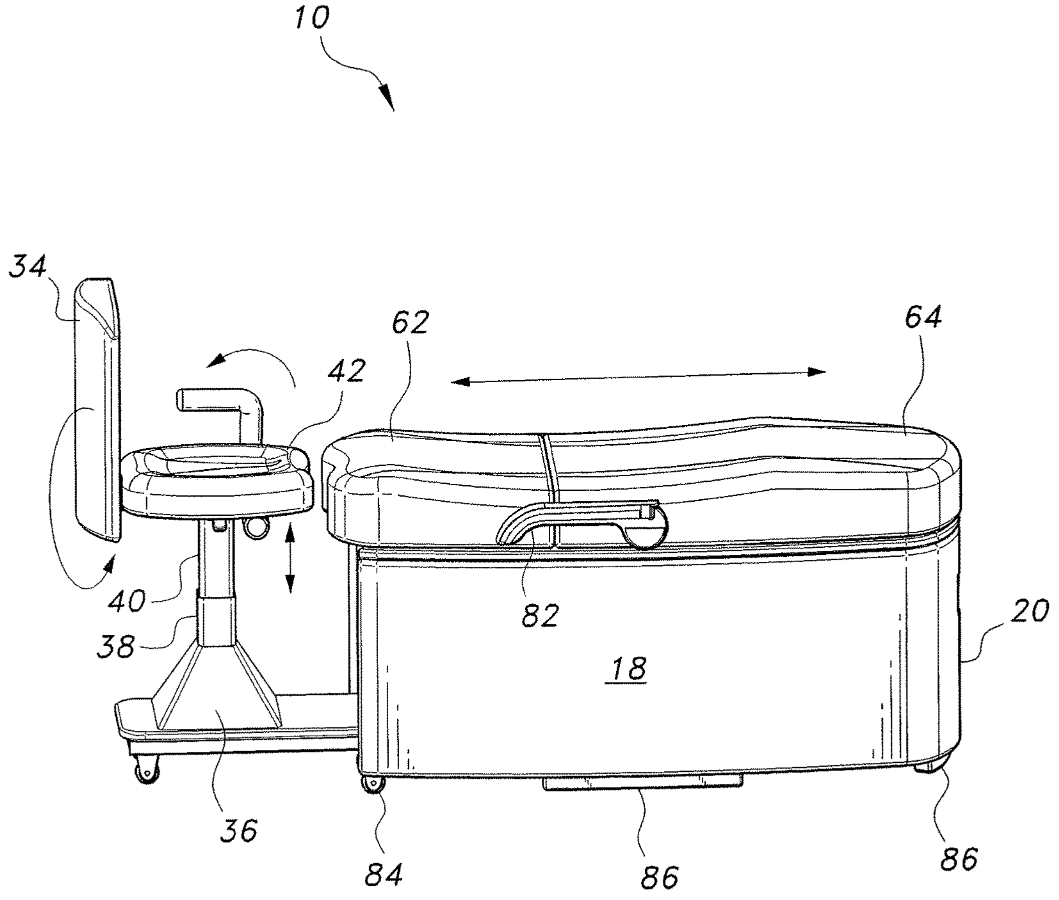
FIG. 4 is a side view of the collapsible lovemaking apparatus of FIG. 1, shown with the chair extended.
Figure 5:
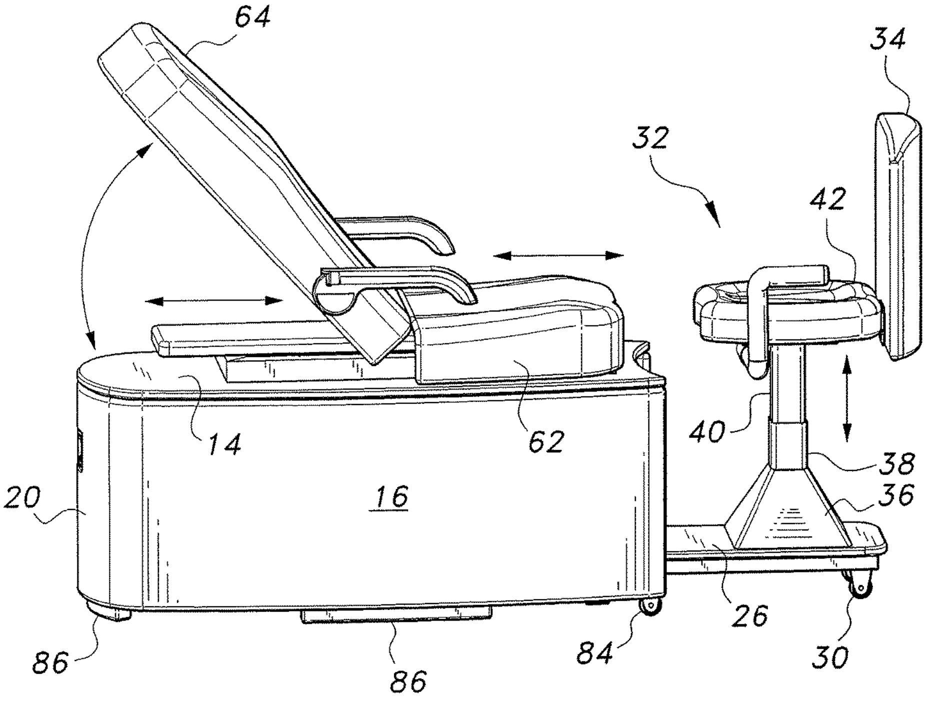
FIG. 5 is a side view of the collapsible lovemaking apparatus of FIG. 1, shown with the chair extended and the trolley mounted reclining chair back raised.
Figure 6:
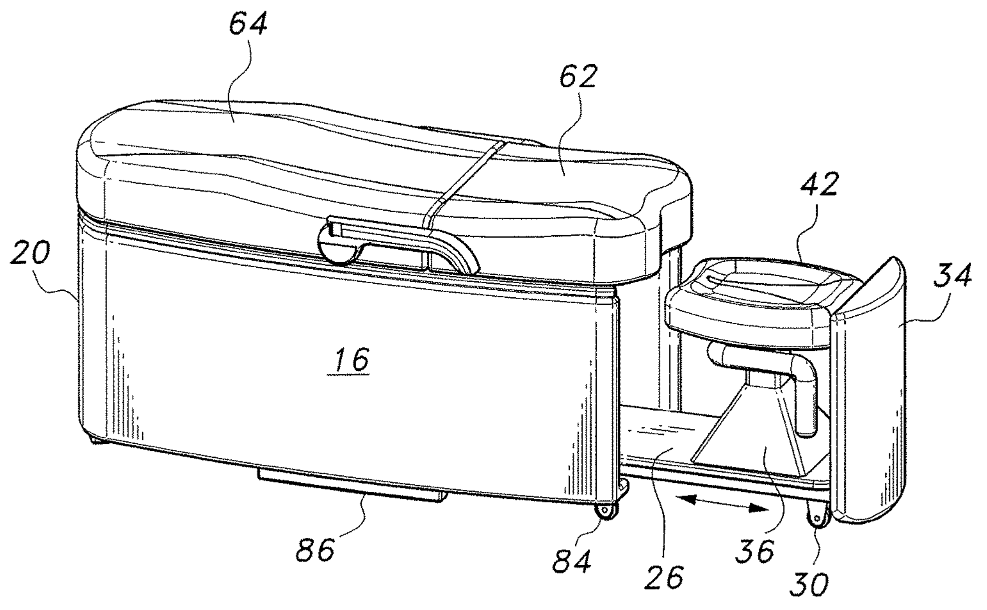
FIG. 6 is a perspective view of the collapsible lovemaking apparatus of FIG. 1, shown with the chair platform extended and the chair back rotated downward.
Figure 7:
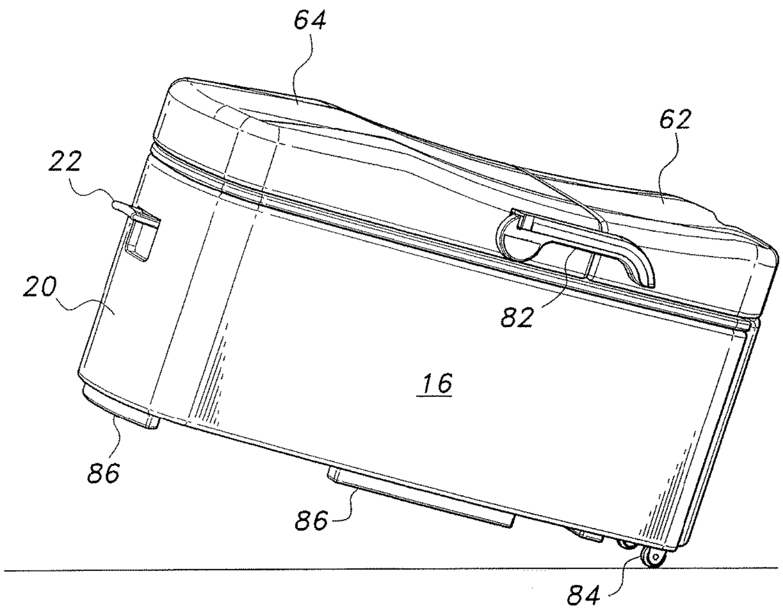
FIG. 7 is a perspective view of the collapsible lovemaking apparatus of FIG. 1, shown in the collapsed configuration and raised for transport.
Figure 8:
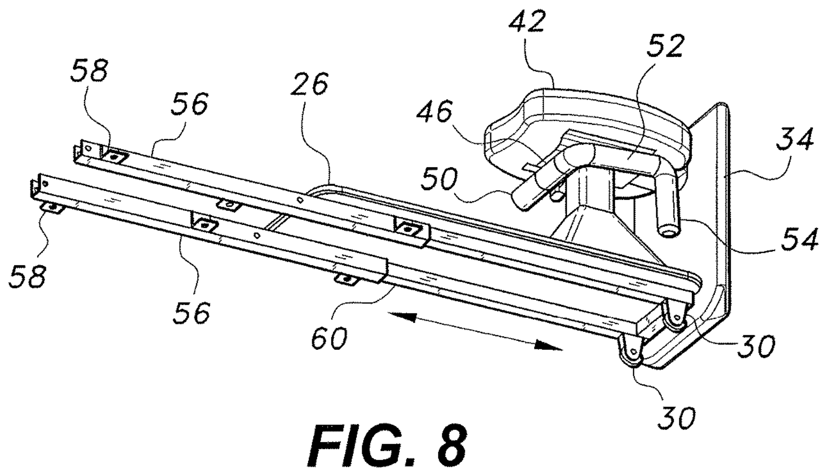
FIG. 8 is a perspective view of the sliding platform for the pedestal chair of the collapsible lovemaking apparatus of FIG. 1.

The collapsible lovemaking apparatus 10 has an elongated housing 12 having opposing ends. The housing 12 includes a floor 13, a top platform 14, opposing sidewalls 16, 18 and a rigidly fixed end wall 20 having a handle 22 that define a hollow interior 24. As shown in FIGS. 1 and 8, a chair platform 26 is slidably mounted on telescoping tubes 28 attached to the floor 13, the platform 26 being slidable out of the open housing end and supported at one end by wheels 30. An adjustable height pedestal chair 32 is mounted on the platform 26, the chair back 34 being rotatable 180° (e.g., by a tube extending rearward from the seat 42 and terminating in a ball and socket joint, the socket being attached to the seat back 34) to define an end wall closing the open end of the housing 12. The pedestal chair 32 has a hollow, pyramidal base 36 attached to the chair platform 26 and a square base tube 38 integral with and extending upward from the pyramidal base 36. An upper square tube 40 is slidably disposed in the base tube 38 and has a chair seat 42 mounted thereon. Height adjustment mechanisms for pedestal chairs are notoriously well known. The pedestal chair 32 may have any height adjustment mechanism known in the art. For example, the base tube 38 and the upper tube 40 may have an internal detent mechanism so that the height of the chair seat 42 may be adjusted at discrete intervals by raising the chair seat 42 until the detent balls clear the detent recess and slowly lowering the seat 42 so that the detent balls temporarily seat in the detent recess.

The pedestal chair 32 has at least one collapsible arm rest 44 attached thereto. As shown in FIGS. 1 and 8, the arm rest 44 may be tubular and may be pivotally attached to the bottom surface of the chair seat 42 by a bracket or tubular sleeve 46. In order to use the arm rest 44, the arm 48 is pulled out from beneath the chair seat 42 and pivoted 90° counterclockwise to align the arm 48 substantially parallel with the floor. The arm rest 44 may be collapsed by rotating the arm 48 by 90° clockwise and sliding the arm 48 below the chair seat 42. The arm rest 44 is maintained in either the extended or the collapsed position by frictional fit of the arm rest 44 in the sleeve 46. The arm 48 may be formed by a pivot tube 50 slidably and rotatably disposed in the sleeve 46, an extension tube 52 extending orthogonally from an end of the pivot tube 50, and a support tube 54 extending from the free end of the extension tube 52 orthogonal to a plane defined by the pivot tube 50 and the extension tube 52.

As shown in FIG. 8, the telescoping tubes 28 include a fixed pair of tubes 56 that are attached to the top surface of the floor 13 by brackets 58 and suitable fasteners. The telescoping tubes 28 also include sliding tubes 60 that telescope into the fixed tubes 56. The chair platform 26 is fixed on top of the sliding tubes 60. Wheels 30 depend from the free ends of the sliding tubes. 60

Figure 9:
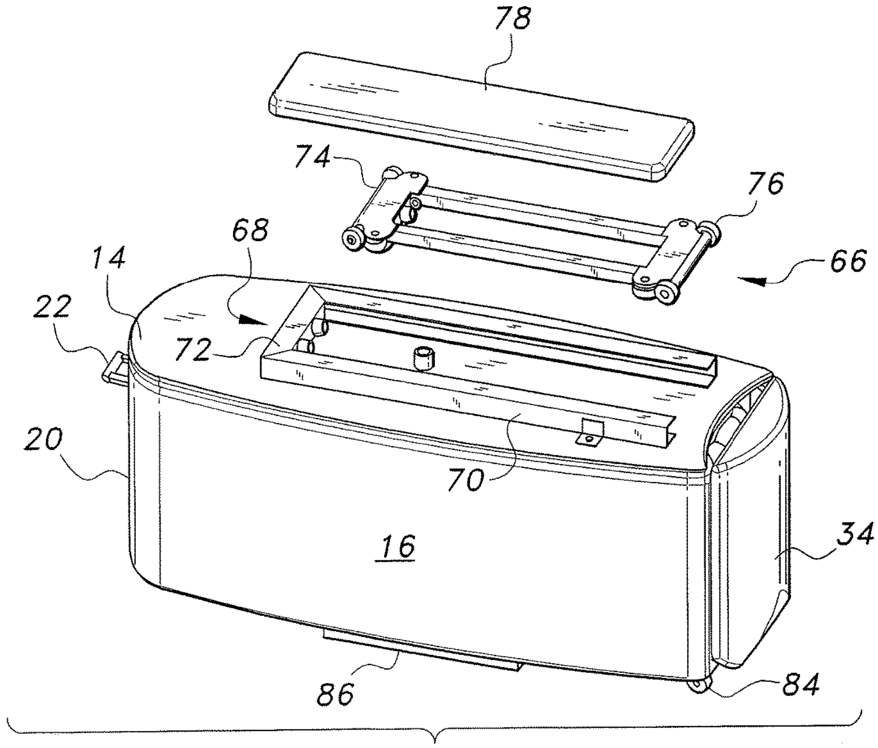
FIG. 9 is a perspective view of the collapsible lovemaking apparatus of FIG. 1, showing the trolley mechanism exploded from the top platform, the trolley-mounted chair seat and reclining chair back being omitted for clarity Similar reference characters denote corresponding features consistently throughout the attached drawings.

A second chair seat 62 having a reclining chair back 64 is mounted on a trolley 66 on the top platform 14 facing the adjustable height chair 32, the reclining back 64 being collapsible to a flat position. As shown in FIG. 9, the trolley 66 is an assembly that may include a U-shaped track 68 formed by parallel, elongated C-shaped rails 70 joined at one end by a short C-shaped bight 72. An elongate carriage 74 is mounted in the track 68 by rollers 76. An elongate trolley platform 78 is mounted on the carriage 74. The second chair seat 62 is mounted on the trolley platform 78. The reclining chair back 64 may be attached to the second chair seat 62 or to the trolley platform 78 by a hinge 80 having a cammed position selector that permits the chair back 64 to recline at discrete, user-selectable angles, or to be collapsed to a flat position against the trolley platform 78. (Mechanisms for reclining chair backs are notoriously well known in the art; the apparatus 10 may use any such mechanism.) The trolley 66 permits the second chair seat 62 and the reclining chair back 64 to be rolled towards and away from the pedestal chair 32 in unison. The reclining chair back 64 may have opposing collapsible arm rests 82 attached thereto. The arm rests 82 may be attached to the chair back 64 by a cam mechanism that permits the arm rests 82 to be raised to and maintained in a position parallel to the floor for use, and then to be released and pivoted parallel to the chair back 64 when the chair back 64 is collapsed. Such cam mechanisms are well known in the art.

Opposing transport wheels 84 are mounted beneath the floor 13 at the open end of the housing 12 so that the handle 22 on the rigid end wall 20 can be grasped and lifted to tilt the apparatus 10 onto the transport wheels 84 to move the apparatus 10 in a manner similar to a wheeled suitcase. High-friction bumpers 86 may be mounted beneath the floor 13 below the rigid end wall 10 and the sidewalls 16, 18 so that the base of the apparatus 10 doesn't move during love making. The trolley-mounted chair seat 62 and reclining chair back 64, as well as the seat 42 and back 34 of the pedestal chair 32, may be upholstered or provided with other chair coverings for comfort and appearance, if desired.

In use, the woman will usually occupy the trolley-mounted seat 62, raising the reclining back 64 (and arm rests 82, if desired) for comfort. The man will grasp the pedestal chair seat back 34 and pull the pedestal chair 32 out of the housing 12, rotating the chair back 180° to configure the chair 32 and raising the arm rest 44, is desired. The man will sit in the pedestal chair 32 (raising the chair seat 42, if necessary), facing the woman in the trolley-mounted chair seat 62. As the love making proceeds, the trolley-mounted chair 62 may be reciprocated by grasping the chair seat 62 and rolling the trolley back and forth, and the pedestal chair 32 may also be reciprocated by rolling the pedestal platform 26 back and forth on wheels 30, the telescoping tubes 28 sliding in and out. When love making is completed, the reclining chair back 64 may be collapsed flat against the trolley assembly (collapsing the arm rests 82, if necessary), and the pedestal chair back 34 may be rotated 180° (collapsing the arm rest 44 under the chair seat 42, if necessary) and rolled back into the housing 12 where the pedestal chair 32 is out of sight. The handle 22 may be used to raise the apparatus 10 onto the transport wheels 84, and the apparatus may be wheeled to a storage location.

It is to be understood that the collapsible lovemaking apparatus is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A collapsible lovemaking apparatus for the disabled, comprising:

- an elongated housing having a floor, a top platform, an open end, a closed end, opposing sidewalls and a hollow interior;
- a pedestal chair assembly having:
  - an elongate chair platform;
  - a pedestal chair mounted on the platform, wherein the pedestal chair comprises:
    - i) a pedestal chair seat and a chair back pivotally attached to the chair seat, the chair back being pivotal between an upright position extending 90° upward from the chair seat for supporting a user's back and a downward position 180° opposite the upward position; and
    - ii) the chair back being configured to define a housing end wall closing the open end of the housing when said pedestal chair is slid into the hollow interior of said housing for storage and transport;
  - telescoping tubes including a pair of fixed tubes fixed onto the floor inside the hollow interior of the housing and a pair of sliding tubes telescoping into the fixed tubes, the sliding tubes being dimensioned and configured to be slidable outside the open end of the housing, the chair platform being mounted on the sliding tubes and adapted to slide into and out of the housing; and
  - pedestal wheels mounted below one of the ends of the chair platform so that the pedestal chair is slidable out of the open end of the housing for use and into the interior of the housing for storage and transport; wherein the pedestal chair is height adjustable from a positon below the housing top platform to a position above the housing top platform;
- a trolley assembly mounted on the top platform of the housing, the trolley including a carriage and a trolley platform mounted on the carriage, wherein the trolley assembly further comprises a U-shaped track formed by parallel, elongated C-shaped rails mounted on the top platform, the carriage having wheels mounted in the track for rotation in the track; and a chair seat and a reclining chair back mounted on the trolley platform, the chair seat facing the pedestal chair when the pedestal chair is extended outside the housing for use, the trolley platform on the housing and the elongated pedestal chair platform below the housing both being slidable towards and away from each other to aid in lovemaking, the reclining chair back and the pedestal chair being collapsible onto and into the housing, respectively, for storage and transport.

2. The collapsible lovemaking apparatus according to claim 1, wherein said pedestal chair further comprises at least one arm rest pivotally and slidably attached to the chair seat of said pedestal chair, the arm rest being pivotal to an upright position beside the chair seat and collapsible to a position beneath the chair seat for storage and transport.

3. The collapsible lovemaking apparatus according to claim 1, further comprising a pair of arm rests pivotally attached to opposite sides of said reclining chair back, the arm rests being pivotal between an upright position for use when said reclining chair back is raised and a collapsed position parallel to said reclining chair back when said reclining chair back is collapsed against said trolley platform.

4. The collapsible lovemaking apparatus according to claim 1, further comprising a handle pivotally attached to the closed end of said housing.

5. The collapsible lovemaking apparatus according to claim 4, the apparatus further comprising a pair of transport wheels mounted beneath the floor at the open end of said housing, whereby the handle may be used to raise the closed end of said housing to roll the apparatus on the transport wheels for transport.

6. The collapsible lovemaking apparatus according to claim 5, further comprising a plurality of high friction bumpers attached beneath the floor of said housing to prevent said housing from moving when the apparatus is used to aide lovemaking.

* * * * *